United States Patent [19]

Garcia

[11] Patent Number: 4,662,605

[45] Date of Patent: May 5, 1987

[54] SPOOL DRIVE FOR PRESSURE REGULATING, PROPORTIONAL SOLENOID VALVE

[75] Inventor: Gary L. Garcia, Newark, N.Y.

[73] Assignee: G. W. Lisk Company, Inc., Clifton Springs, N.Y.

[21] Appl. No.: 696,408

[22] Filed: Jan. 30, 1985

[51] Int. Cl.⁴ ............................................. F16K 31/02
[52] U.S. Cl. ......................... 251/129.08; 251/129.15; 137/14; 137/625.69; 91/429; 91/433
[58] Field of Search ............ 251/141, 282, 129, 129.01, 251/129.05, 129.07, 129.08, 129.15; 137/1, 14, 625.65, 625.69; 91/429, 433, 430

[56] References Cited

U.S. PATENT DOCUMENTS

| Re. 25,494 | 12/1963 | MacDuff | 137/625.69 |
|---|---|---|---|
| 2,455,315 | 11/1948 | Rose et al. | 91/429 |
| 2,681,116 | 6/1954 | Treseder | 91/429 |
| 2,781,743 | 2/1957 | Mann et al. | 91/429 |
| 3,174,505 | 3/1965 | Bauer | 137/505.18 |
| 3,802,453 | 4/1974 | Fleury | 137/625.69 |
| 3,880,476 | 4/1975 | Belart et al. | 137/625.65 |
| 4,071,042 | 1/1978 | Lombard et al. | 137/332 |
| 4,103,695 | 8/1978 | Aono | 137/1 |
| 4,119,294 | 10/1978 | Schnorrenberg | 251/129 |
| 4,316,599 | 2/1982 | Bouvet et al. | 91/433 |
| 4,478,250 | 10/1984 | Lukasczyk et al. | 137/625.65 |

FOREIGN PATENT DOCUMENTS 191386  11/1983  Japan ............................. 137/625.65

Primary Examiner—Samuel Scott
Assistant Examiner—Noah Kamen
Attorney, Agent, or Firm—Stonebraker, Shepard & Stephens

[57] ABSTRACT

A pressure regulating spool valve 10 having a body 25 within which a spool 20 is moved in a dither motion by a proportional solenoid 15 has a spool land 40 separating high and low pressure fluids and spanning and cooperating with a regulated port recess 51 in body 25 for variably opening high and low pressure windows 54 and 55. With opposite edges 52 and 53 of recess 51 spaced apart by a distance X, the opposite edges 42 and 43 of spool land 40 spaced apart by a distance Y, and the dither motion imposed on spool 20 by solenoid 15 having an axial excursion A, the relationship $X \leq Y \leq (X+A)$ applies. This makes the alternating overlap of spool land 40 with recess edges 52 and 53 equal to or less than the dither excursion so that high and low pressure windows 54 and 55 of the regulated port 50 are opened for a predetermined portion of each half cycle of the dither motion.

13 Claims, 5 Drawing Figures

SPOOL DRIVE FOR PRESSURE REGULATING, PROPORTIONAL SOLENOID VALVE

BACKGROUND

I have improved the fabrication and operation of pressure-regulating spool valves. Previous suggestions for such spool valves include U.S. Pat. Nos. 3,174,505; 4,071,042; 4,119,294; and 4,478,250; and the subject matter of a U.S. patent application entitled PRESSURE REGULATING SPOOL VALVE AND METHOD, naming Raymond E. Johnson as inventor and owned by the assignee of this application.

My invention improves over previous suggestions for pressure regulating spool valves in several respects. Thes include making the valve compact, inexpensive to manufacture, easily adjustable to meet performance standards, fast and reliable in operation, responsive to control, and less subject to hysteresis error.

SUMMARY OF THE INVENTION

My invention applies to a pressure regulating spool valve having a body within which a spool is moved in a dither motion by a proportional solenoid so that a spool land between high and low pressure fluids spans and cooperates with a regulated port recess in the body for variably opening high and low pressure windows to the regulated load. With the opposite edges of the recess spaced apart by a distance X, the opposite edges of the spool land spaced apart by a distance Y, and the dither motion imposed on the spool by the solenoid having an axial excursion A, I use the relationship $X \leq Y \leq (X+A)$. This makes the alternating overlap of the spool land with the recess edges equal to or less than the dither excursion so that the high and low pressure windows to the regulated port are opened for a predetermined portion of each half cycle of the dither motion, making the valve responsive and comparatively free of hysteresis error.

Regulated pressure is applied to the valve spool to counter the force of the solenoid, and I accomplish this with a socketed plug closing an end of the valve body opposite the solenoid and carrying a pin engaging the spool and axially movable within the socket. I apply regulated pressure fluid to the socket end of the pin and also use a compression spring engaging the plug and the spool. These measures contribute to low cost, compactness, low friction, and effective operation.

The regulating port land on the spool of my valve is "cantilevered" in that the valve spool has a bearing surface on only one side of the land and the alternating overlap of the land with opposite edges of the regulated port recess combines with the bearing surface to provide all the bearing support needed for the spool. This also contributes to compactness, simplicity, and low cost, while being adequately durable.

DRAWINGS

DETAILED DESCRIPTION

Figure 1:
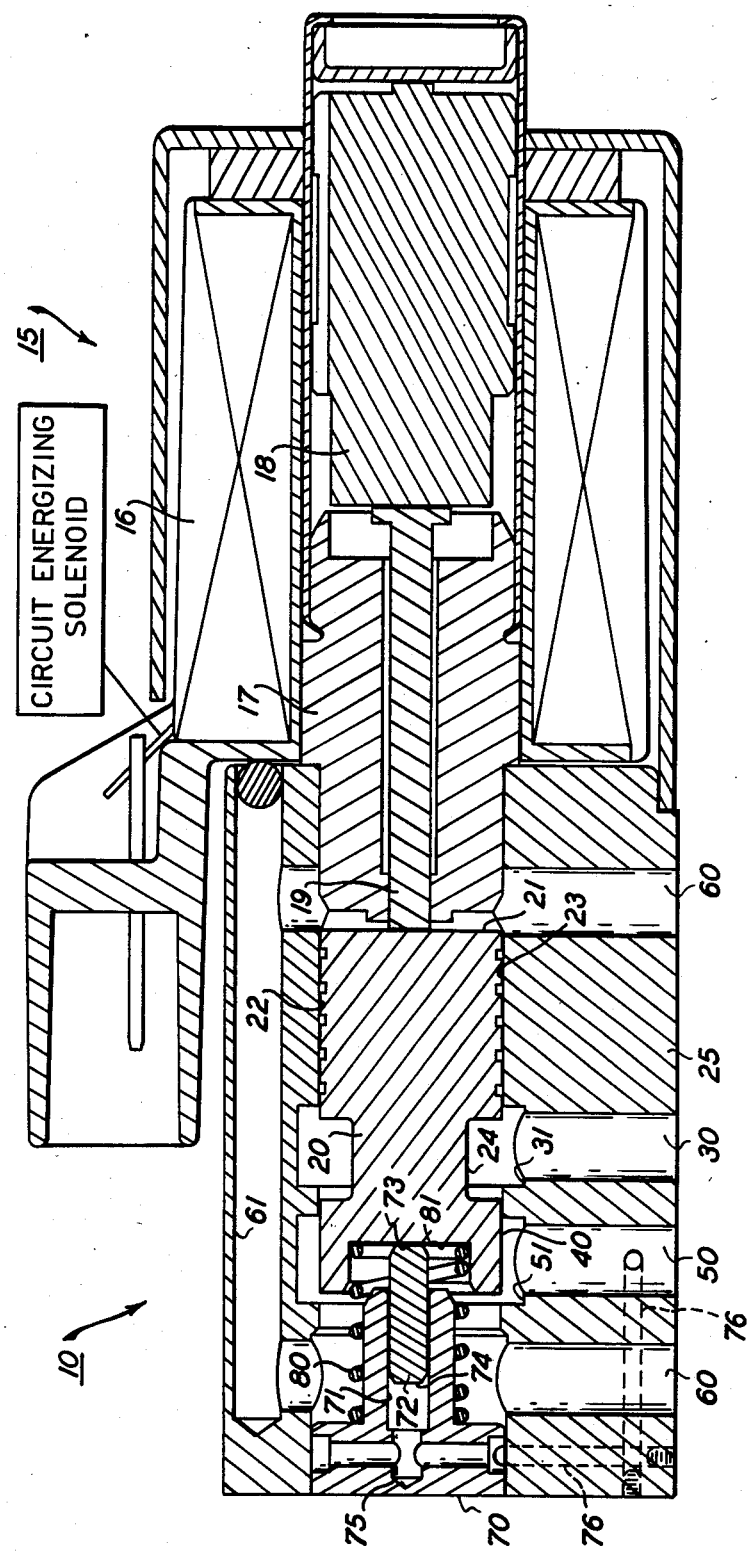
FIG. 1 is a partially schematic, longitudinal cross-sectional view of a preferred embodiment of my inventive spool valve.
Figure 2:
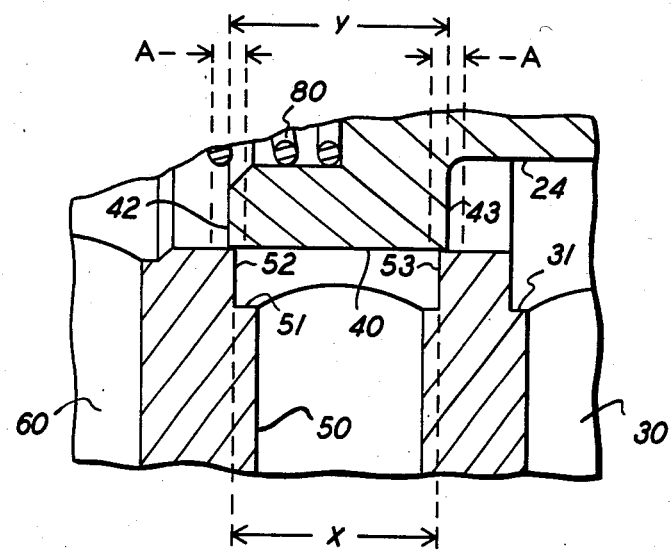
FIGS. 2-4 are fragmentary, cross-sectional views illustrating the effects of land, regulated port recess, and dither excursion dimensions.
Figure 3:
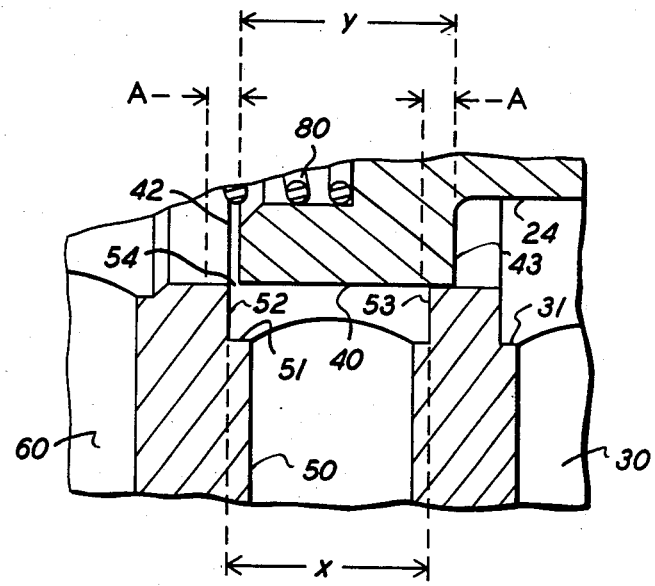

My pressure regulating spool valve 10, a preferred embodiment of which is illustrated in FIG. 1, is driven by a proportional solenoid 15, although other solenoids and other drivers of valve 10 are possible. Solenoid 15 includes coil 16, fixed pole piece 17, movable armature 18, and push rod 19 that engages proximal end 21 of valve spool 20. Energy applied to coil 16 draws armature 18 toward pole piece 17, moving push rod 19 and spool 20. The force of this movement is preferably proportional to the energy applied to coil 16 of proportional solenoid 15.

Spool 20 moves axially within a bore 22 that is formed in valve body 25 coaxially with push rod 19. A proximal region of spool 20 adjacent spool end 21 has a bearing surface 23 engaging bore 22 for guiding spool 20 in its axial movement.

A supply or high pressure fluid port 30 leading into an annular internal recess 31 within valve body 25 admits high pressure fluid into communication with recess 24 in valve spool 20. A land 40 in a distal end region of spool 20 spans an internal annular recess 51 of a controlled or regulated pressure port 50 leading variably pressured fluid to a load. The opposite edges of land 40 and recess 51 are both preferably annular and parallel, and the way land 40 cooperates with recess 51 to regulate pressure in output 50 is explained below.

Two exhaust or low pressure ports 60, connected by a passageway 61, communicate with a low pressure fluid reservoir. This balances spool 20 by applying low pressure fluid to its opposite ends so that any small variations in exhaust pressure cannot subject spool 20 to disequilibrium.

A plug 70 closes the open end of bore 22 opposite solenoid 15 and fixed pole piece 17. Plug 70 has a socket or cylinder 71 in which a pin or piston 72 is axially movable. A spool end 73 of pin 72 engages valve spool 20, and a socket end 74 of pin 72 is subjected to regulated pressure for movement as a pressure sensing piston within socket 71. A constricted end 75 of socket 71 receives regulated fluid pressure from control port 50 via a line 76, which can be variously formed in valve body 25 as schematically illustrated in FIG. 1. Line 76 can also extend to a manifold (not shown) over a port region of valve body 25 where the manifold can connect passage 76 to port 50, or line 76 can be formed externally of valve body 25.

A compression coil spring 80 surrounds socket 71 of plug 70 and seats in a distal end recess 81 in valve spool 20 to resist movement force of solenoid 15. I prefer dimensioning spring 80 to loosely fit around socket 71 and engage plug 70 and spool 20 only in end regions of spring 80 to minimize friction. Other spring arrangements are possible, and cylinders or sockets can be formed in end plug 70 in different ways.

With a predetermined spring force for spring 80, it is possible to seat plug 70 in a fixed and predetermined position in the end of bore 22, with predictable performance results. It is also possible to make plug 70 axially adjustable within bore 22 so that plug 70 can be pressed as deeply as required into bore 22 to establish the proper force for spring 80 to counter the force of solenoid 15.

The regulated pressure range for valve 10 can be easily changed by substituting a plug 70 with a different diameter cylinder 71 and pin 72, thus varying the counter force resisting the movement force of solenoid 15. Changing the winding of solenoid coil 16 can also change the movement force on spool 20 and vary the regulated pressure range.

Operation

Spool 20 responds to disequilibrium between the opposing and variable forces of solenoid 15 pushing against proximal end 21 of spool 20 by rod 19, and being opposed by the spring 80 in combination with the regulated pressure applied to pin 72, both pushing against the distal end 81 of spool 20. When these opposing forces are unequal, spool 20 moves in a direction to restore equilibrium.

Spool 20 is also preferably driven in a dither motion by solenoid 15. This is preferably accomplished by an AC signal combined with a variable force DC signal applied to solenoid coil 16. While the DC component of the signal provides the main motive force positioning spool 20, the AC component of the signal gives spool 20 a predetermined dither motion that helps overcome friction resisting changes in the position of spool 20. The AC signal preferably ranges in frequency between 50 to 200 Hz and preferably operates in the 70 to 140 Hz region of the range. The AC signal can also vary in amplitude to give the dither motion a desired total excursion A as explained below.

Figure 4:
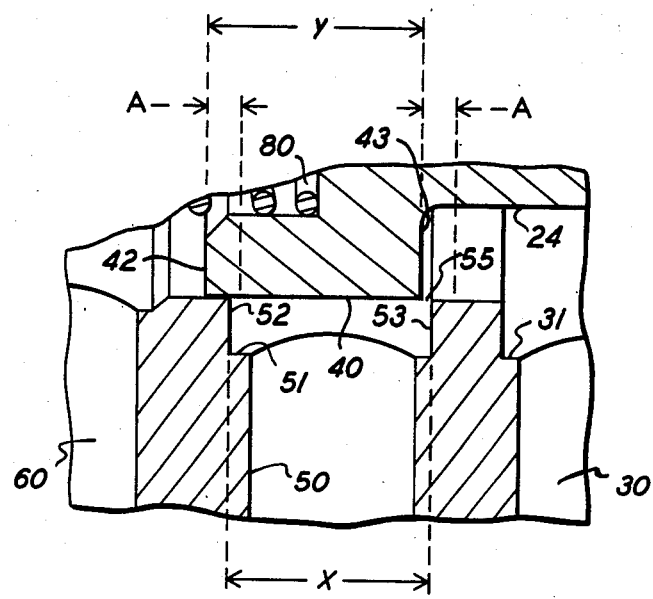
Figure 5:
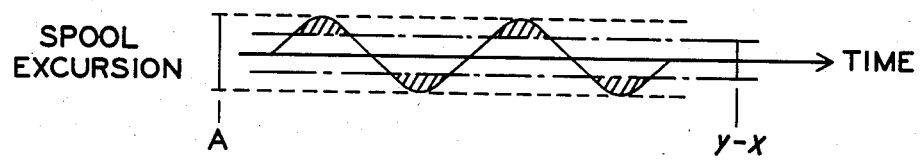
FIG. 5 is a diagram showing opening of high and low pressure windows on alternate half cycles of dither motion.

Opposite edges 52 and 53 of regulated port recess 51 cooperate with corresponding opposite edges 42 and 43 of land 40 spanning recess 51 for variably opening a low pressure or exhaust window 54 (FIG. 3) and a high pressure or supply window 55 (FIG. 4). With reference to FIGS. 2-5, the distance Y between opposite edges 42 and 43 of land 40 is preferably equal to or somewhat larger than the distance X between opposite edges 52 and 53 of regulated port recess 51. Also, the total axial excursion A of the dither motion applied to spool 20 is preferably equal to or larger than the difference between distances X and Y. This relationship can be expressed: $X \leq Y \leq (X+A)$, and it is illustrated schematically in FIGS. 2-4 and shown graphically in FIG. 5.

In a typical situation, land width Y exceeds recess width X by about 0.010 inches, and the spool dither excursion distance A is about 0.015 inches. Varying these parameters determines the portion of each half cycle of dither motion that high and low pressure windows 55 and 54 will be cracked open when spool 20 is in a modulating position holding a steady regulated pressure. I prefer that in a modulating state, as distinct from a period of rapid change in regulated pressure, exhaust window 54 and supply window 55 will each open slightly on alternate half cycles of dither motion. The open window portions of the dither cycle are shaded in FIG. 5 for the typical values given above.

By making Y−X nearly equal to A, which means that land 40 overlaps recess 51 by nearly the full excursion of dither motion A, the opening of high and low pressure windows 55 and 54 can be reduced to a tiny fraction of each dither cycle. This would make the valve "tight" and require very little supply replenishment to maintain a steady regulated pressure in port 50. At the opposite extreme, letting Y−X approach zero, meaning that land 40 barely spans recess 51, causes high and low pressure windows 55 and 54 to be open for a large fraction of their respective half cycles of dither motion. This makes the valve fast acting and responsive, but requires more supply flow to maintain a steady regulated pressure.

I have found that opening high and low pressure windows on each half cycle of dither motion in a modulating state reduces hysteresis error for spool 20, compared to a modulating state that does not open port windows. Lower hysteresis error reduces overshoot and undershoot and narrows the control range for valve 10. It enables the valve to make practically undetectable shifts in position for correcting what otherwise would become pressure fluctuations.

Most spool valves have lengthy or spaced-apart bearing surfaces, giving the spool a long enough "wheel base" for accurate guidance within the valve body. On the other hand, any excess length adds to the expense, makes the valve less compact, and increases the spool mass to be overcome in changing regulated pressure.

I have found that a combination of bearing surface 23, preferably proximate to solenoid 15, and the alternately overlapping engagement of land 40 with the edges of recess 51 affords adequate spool guidance and ensures a long spool life, while also reducing spool length and mass, and correspondingly reducing cost and improving performance.

I claim:

1. In a pressure regulating spool valve having a body within which pressurized fluid is admitted to a balanced recess in a spool moved in a dither motion by a proportional solenoid so that a land of said spool spans a regulated port recess in said body and variably opens high and low pressure windows at respective opposite edges of said recess, an improvement comprising:

a. circuit means for controlling said solenoid to make said dither motion of said spool follow the relationship $X \leq Y \leq (X+A)$, wherein X=the distance between opposite edges of said recess, Y=the distance between opposite edges of said land, and A=an axial excursion of said dither motion;

b. a socketed plug closing an end of said valve body in a region spaced from said solenoid;

c. a pin axially movable within said socket in said plug, said pin engaging said spool and having a diameter substantially smaller than said spool; and d. means for resisting movement force of said solenoid, including a fluid passageway applying regulated pressure fluid to a socket end of said pin and a compression spring engaging said plug and said spool.

2. The valve of claim 1 wherein said spring is a single compression spring extending around said socket and disposed clear of engagement with said spool and said plug except at end regions of said spring.

3. The valve of claim 1 wherein said plug is adjustable in said body for varying the force of said spring.

4. The valve of claim 1 wherein the only contact between said spool and said body occurs in the alternating overlap of said land edges with said recess edges and in a body-engaging, spool bearing region spaced from said land on only one side of said land.

5. The valve of claim 1 wherein said relationship is $X < Y < (X+A)$.

6. A method of operating a pressure regulating valve having a valve body with an internal annular recess having axially spaced edges communicating with a regulated port and a valve spool receiving pressurized fluid in a balanced recess adjacent a land spanning said valve body recess and having opposite land edges communicating respectively with high pressure and low pressure, said method comprising:

a. electrically dithering said spool within said body by means of a proportional solenoid driven with a variable force that includes a sinusoidal signal for axially moving said spool in an excursion A;

b. dimensioning said land and said recess so that said excursion A is larger than an amount by which an axial distance Y between said land edges exceeds an axial distance X between said valve body recess edges so that $X < Y < (X+A)$;

c. arranging said land and said valve body recess so that one pair of said land and recess edges opens a high pressure window for a predetermined portion of a half cycle of said dither and another pair of said land and recess edges opens a low pressure window for a predetermined portion of another half cycle of said dither and at a steady regulated pressure said high and low pressure window openings are substantially equal; and d. applying a portion of the regulated pressure from said regulated port to said valve spool in resistance to said variable force applied via said proportional solenoid.

7. The method of claim 6 including applying said regulated pressure to the bottom of a socket in a plug that is seated to close an end of said valve body in a region spaced from said solenoid, said socket having a substantially smaller diameter than said spool so that said regulated pressure moves a pin within said socket against said spool to exert said portion of said regulated pressure against movement force of said solenoid.

8. The method of claim 7 including biasing said spool against movement force of said solenoid by arranging a single compression spring between said spool and said plug.

9. The method of claim 8 including minimizing friction from said spring by keeping all but end regions of said spring clear of said spool and said plug.

10. The method of claim 8 including adjusting the force of said spring by varying the seating of said plug in said body.

11. In a pressure regulating spool valve having a regulated port recess in a body for said valve, a solenoid driving a spool for said valve, pressurized fluid input to a balanced recess in said spool adjacent a land of said spool, and said land of said spool spanning said reguated port recess and having opposite sides respectively communicating with fluid at supply and exhaust pressures, an improvement comprising:

a. opposite edges of said regulated port recess being spaced apart by an axial distance X;

b. opposite edges of said land being spaced apart by an axial distance Y;

c. circuit means for energizing said solenoid with a signal of varying force that includes a sinusoidal component for imposing on said spool a dither motion having an axial excursion A, whereby $X \leq Y < (X+A)$ so that each of said land edges alternately clears and overlaps a respective one of said recess edges; and d. said solenoid being a proportional solenoid, and a portion of the regulated pressure from said port recess being applied to said valve spool in opposition to said varying force signal applied via said proportional solenoid.

12. The improvement of claim 11 wherein alternately opened windows between said land and recess edges communicate said regulated port recess with said supply and exhaust pressures and are substantially equal sized whenever said regulated pressure is steady.

13. The improvement of claim 11 wherein said land is in a distal end region of said spool.

* * * * *